United States Patent [19]

Rockenfeller et al.

[11] Patent Number: 5,598,721
[45] Date of Patent: *Feb. 4, 1997

[54] HEATING AND AIR CONDITIONING SYSTEMS INCORPORATING SOLID-VAPOR SORPTION REACTORS CAPABLE OF HIGH REACTION RATES

[75] Inventors: Uwe Rockenfeller; Lance D. Kirol, both of Boulder City, Nev.

[73] Assignee: Rocky Research, Boulder City, Nev.

[ * ] Notice: The term of this patent shall not extend beyond the expiration date of Pat. No. 5,298,231.

[21] Appl. No.: 412,147

[22] Filed: Mar. 28, 1995

Related U.S. Application Data

[63] Continuation-in-part of Ser. No. 104,427, Aug. 9, 1993, Pat. No. 5,441,716, which is a continuation-in-part of Ser. No. 931,036, Aug. 14, 1992, Pat. No. 5,328,671, and Ser. No. 975,973, Nov. 13, 1992, Pat. No. 5,298,231, which is a continuation of Ser. No. 320,562, Mar. 8, 1989, abandoned, and a continuation-in-part of Ser. No. 327,150, Oct. 21, 1994, Pat. No. 5,477,706, which is a continuation of Ser. No. 59,548, May 11, 1993, abandoned.

[51] Int. Cl.⁶ .................................................. F25B 15/00
[52] U.S. Cl. ................................................. 62/480; 62/481
[58] Field of Search ........................... 62/476, 480, 481, 62/101; 237/50; 165/104.12

[56] References Cited

U.S. PATENT DOCUMENTS

| | | | |
|---|---|---|---|
| 992,560 | 5/1911 | Heuser | 62/476 |
| 1,686,425 | 3/1927 | Von Platen et al. | 62/480 |
| 1,833,901 | 12/1931 | Hull | 62/480 |
| 1,881,568 | 10/1932 | Henney . | |
| 1,908,413 | 5/1933 | Elfving . | |
| 1,932,492 | 10/1933 | Smith | 62/480 |
| 1,954,056 | 4/1934 | Miller . | |
| 1,972,426 | 9/1934 | Noebel . | |
| 1,987,911 | 1/1935 | Prickett . | |
| 1,992,745 | 2/1935 | Elfving . | |

(List continued on next page.)

FOREIGN PATENT DOCUMENTS

| | | |
|---|---|---|
| 664520 | 9/1965 | Belgium . |
| 0193747 | 9/1986 | European Pat. Off. . |
| 0196863 | 10/1986 | European Pat. Off. . |
| 0470886 | 12/1992 | European Pat. Off. . |
| 2679633 | 1/1993 | France . |
| 436988 | 11/1926 | Germany . |
| 3509564 | 9/1986 | Germany . |
| 328301 | 1/1929 | United Kingdom . |
| 417044 | 12/1932 | United Kingdom . |
| 415488 | 3/1933 | United Kingdom . |
| 424456 | 4/1934 | United Kingdom . |
| 8500213 | 1/1985 | WIPO . |
| 9010491 | 9/1990 | WIPO . |
| WO9107627 | 11/1990 | WIPO . |
| WO9222776 | 12/1992 | WIPO . |
| WO9411685 | 8/1993 | WIPO . |
| WO9427098 | 4/1994 | WIPO . |

OTHER PUBLICATIONS

*Revue Phys. Appl.*, vol. 18 (1983), pp. 107–112, Mauran et al.
*Refrigerating Engineering*, "Absorption Refrigeration with Solid Absorbents", by R. M. Buffington, pp. 137–142 (Sep. 1933).
*Refrigerating Engineering*, "Comfort Cooling in a Refrigerating Plant", by R. H. Smith, p. 152 (Sep. 1933).
English Translation of French Patent No. 2679633.
English Translation of German Patent No. DE3509564 Abstract.
Physique Appliquee 18, "Optimisation des densities energetiques de systeme stockage chimique basee sur des reactions solide gaz . . . ," (Feb. 1983), pp. 107–112.

*Primary Examiner*—William Doerrler
*Attorney, Agent, or Firm*—Jerry R. Seiler, Esq.

[57] ABSTRACT

A heating system incorporates one or more reactors containing a complex compound of a metal salt and a polar gas adsorbed thereon in which the volumetric expansion of the complex compound is restricted during adsorption and which reactors comprise one or more reaction chambers having a maximum mean mass diffusion path length of less than about 15 mm, and/or a maximum thermal diffusion path length of less than 1.5 min.

69 Claims, 4 Drawing Sheets

U.S. PATENT DOCUMENTS

| | | |
|---|---|---|
| 2,019,356 | 10/1935 | Normelli . |
| 2,067,678 | 1/1937 | Nesselmann . |
| 2,068,891 | 1/1937 | Scholl . |
| 2,088,276 | 7/1937 | Nesselmann et al. . |
| 2,167,264 | 7/1939 | Dunz . |
| 2,196,021 | 4/1940 | Merrill . |
| 2,236,575 | 4/1941 | Kogel . |
| 2,241,600 | 5/1941 | Hunsicker . |
| 2,253,907 | 8/1941 | Levine . |
| 2,257,735 | 10/1941 | Kleen . |
| 2,276,947 | 3/1942 | Kleen . |
| 2,326,130 | 8/1943 | Kleen . |
| 2,340,886 | 2/1944 | Kleen . |
| 2,340,887 | 2/1944 | Kleen . |
| 2,353,713 | 7/1944 | Kleen . |
| 2,353,714 | 7/1944 | Kleen . |
| 2,370,643 | 3/1945 | Kleen . |
| 2,374,184 | 4/1945 | Kleen . |
| 2,384,460 | 9/1945 | Kleen . |
| 2,393,241 | 1/1946 | Kleen . |
| 2,401,233 | 5/1946 | Kleen . |
| 2,461,262 | 2/1949 | Kleen . |
| 2,496,459 | 2/1950 | Kleen . |
| 2,513,148 | 6/1950 | Coons . |
| 2,521,538 | 9/1950 | Rees . |
| 2,528,004 | 10/1950 | Kleen . |
| 2,537,720 | 1/1951 | Wagner . |
| 2,539,986 | 1/1951 | Brace . |
| 2,557,373 | 6/1951 | Coons . |
| 2,587,996 | 3/1952 | Gross . |
| 2,649,700 | 8/1953 | Piper . |
| 2,715,817 | 8/1955 | Brodheim . |
| 2,801,706 | 8/1957 | Asker . |
| 2,945,554 | 7/1960 | Berly . |
| 2,989,383 | 6/1961 | Miller . |
| 3,167,399 | 1/1965 | Hansen, Jr. . |
| 3,280,591 | 10/1966 | Webster . |
| 3,411,318 | 11/1968 | Puckett . |
| 3,661,200 | 5/1972 | McNamara . |
| 3,742,727 | 7/1973 | Kaiser . |
| 4,111,002 | 9/1978 | Van Mal et al. . |
| 4,183,227 | 1/1980 | Bouvin et al. . |
| 4,199,959 | 4/1980 | Wurm . |
| 4,205,531 | 6/1980 | Brunberg et al. . |
| 4,408,468 | 10/1983 | Alefeld . |
| 4,419,107 | 12/1983 | Roydhouse . |
| 4,439,994 | 4/1984 | Briley . |
| 4,468,717 | 8/1984 | Mathias . |
| 4,479,364 | 10/1984 | Maier-Laxhuber . |
| 4,523,635 | 6/1985 | Nishizaki et al. . |
| 4,548,046 | 10/1985 | Brandon et al. . |
| 4,581,049 | 4/1986 | Januschkowetz . |
| 4,594,856 | 6/1986 | Rothmeyer . |
| 4,610,148 | 9/1986 | Shelton . |
| 4,623,018 | 11/1986 | Takeshita et al. . |
| 4,637,218 | 1/1987 | Tchernev . |
| 4,638,646 | 1/1987 | Koseki et al. . |
| 4,656,839 | 4/1987 | Cross et al. . |
| 4,694,659 | 9/1987 | Shelton . |
| 4,701,199 | 10/1987 | Kabe . |
| 4,709,558 | 12/1987 | Matsushita et al. . |
| 4,722,194 | 2/1988 | Kantor . |
| 4,759,191 | 7/1988 | Thomas et al. . |
| 4,765,395 | 8/1988 | Paeye et al. . |
| 4,801,308 | 1/1989 | Keefer . |
| 4,822,391 | 4/1989 | Rockenfeller . |
| 4,823,864 | 4/1989 | Rockenfeller . |
| 4,848,994 | 7/1989 | Rockenfeller . |
| 4,875,915 | 10/1989 | Rockenfeller . |
| 4,881,376 | 11/1989 | Yonezawa et al. . |
| 4,885,016 | 12/1989 | Griffiths . |
| 4,901,535 | 2/1990 | Sabin et al. . |
| 4,906,258 | 3/1990 | Balat et al. . |
| 4,944,159 | 7/1990 | Crozat . |
| 4,949,549 | 8/1990 | Steidl et al. . |
| 4,956,977 | 9/1990 | Maier-Laxhuber et al. . |
| 4,974,419 | 12/1990 | Sabin et al. . |
| 4,976,117 | 12/1990 | Crozat et al. . |
| 4,993,239 | 2/1991 | Steidl et al. . |
| 5,005,371 | 4/1991 | Yonezawa . |
| 5,024,064 | 6/1991 | Yonezawa et al. . |
| 5,025,635 | 6/1991 | Rockenfeller et al. . |
| 5,027,607 | 7/1991 | Rockenfeller . |
| 5,038,581 | 8/1991 | Maier-Laxhuber et al. . |
| 5,057,132 | 10/1991 | Lebrun et al. . |
| 5,079,928 | 1/1992 | Rockenfeller . |
| 5,085,271 | 2/1992 | Yanadori et al. . |
| 5,157,937 | 10/1992 | Choung et al. . |
| 5,186,020 | 2/1993 | Rockenfeller et al. . |
| 5,263,330 | 11/1993 | Rockenfeller et al. . |
| 5,272,891 | 12/1993 | Erickson . |
| 5,298,231 | 3/1994 | Rockenfeller ............................ 423/299 |
| 5,328,671 | 7/1994 | Rockenfeller ............................ 423/210 |
| 5,335,519 | 8/1994 | Bernier . |
| 5,360,057 | 11/1994 | Rockenfeller et al. . |

HEATING AND AIR CONDITIONING SYSTEMS INCORPORATING SOLID-VAPOR SORPTION REACTORS CAPABLE OF HIGH REACTION RATES

This application is a continuation-in-part of U.S. patent application Ser. No. 08/104,427 filed Aug. 9, 1993, now U.S. Pat. No. 5,441,716, which is a continuation-in-part of 07/931,036 filed Aug. 14, 1992, now U.S. Pat. No. 5,328,671 and 07/975,973 filed Nov. 13, 1992, now U.S. Pat. No. 5,298,231 which is a continuation of 07/320,562 filed Mar. 8, 1989, abandoned, and is a continuation-in-part of application Ser. No. 08/327,150 filed Oct. 21, 1994, now U.S. Pat. No. 5,477,706, which is a continuation of 08/059,548 filed May 11, 1993, abandoned.

BACKGROUND OF THE INVENTION

In the aforesaid applications and patents there are disclosed improved apparatus and methods for achieving high adsorption/desorption reaction rates between polar gases and certain metal salts. These adsorption/desorption reactions, often referred to as "absorption" or "chemisorption" in technical literature, yield complex compounds which are the basis for efficient refrigeration, thermal storage, heat pump and power systems having high energy density. The aforesaid disclosed methods result in increased or maximized reaction rates between the gas and the complex compound, i.e., the time it takes to adsorb or desorb a given amount of the gas into or from the complex compound, to yield increased or improved power that can be delivered by the system, i.e., more energy delivered over a period of time, which translates into greater cooling capability of the apparatus. In the aforesaid U.S. Pat. Nos. 5,298,231 and 5,328,671, improved complex compound reactors are disclosed in which the complex compound adsorbents are those created by optimizing the density of the complex compound by limiting its volumetric expansion formed during at least the initial adsorption reaction between the metal salt and the polar gas. The resulting complex compounds are those in which the adsorption and desorption reaction rates are increased as compared to reaction rates using a complex compound formed without restricting the volumetric expansion and controlling the density during such a reaction. The increase in the reaction rates is expressed as an increase in the number of moles of polar gas adsorbed and/or desorbed per mole of the complex compound per hour at adsorption or desorption cycle times of less than 60 minutes. The description of such methods, reactors and complex compounds of the aforesaid patents and applications are incorporated herein by reference.

In the aforesaid application 104,427 there are disclosed further improved methods and apparatus for achieving improved reaction rates incorporating sorption reactors having thermal and mass diffusion path lengths within important defined limits. The reactors and resulting reactions are capable of achieving a maximum power density per mass of adsorbent, maximum power density per mass of reactor and maximum power density per desired or needed reactor volume. The specific reaction parameters and apparatus features and components including heat and mass transfer path length ranges for achieving such results as described in the aforesaid application are incorporated herein by reference.

In aforesaid application Ser. No. 327,150 there are disclosed methods and apparatus for achieving improved heat rejection from an adsorbing reactor in solid-vapor sorption systems. The systems include apparatus in which the system refrigerant is used as the heat transfer fluid for cooling an adsorbing reactor, activation of a heat rejection loop for cooling an adsorbing reactor using displacement of the heat transfer fluid without requiring thermostat or solenoid valve control of the cooling loop, and for transferring heat from a single heat source to either of two reactors to provide continuous refrigeration or cooling. Such apparatus and methods described in the aforesaid application are also incorporated herein by reference.

SUMMARY OF THE INVENTION

The present invention is directed to heating and air conditioning appliances and systems including furnaces and heat pumps incorporating reactors and methods described in the aforesaid incorporated patents and applications. Specific preferred apparatus include single and multiple stage furnaces and air conditioning and heat pump systems for residential and commercial use. The specific design and components of such apparatus will be disclosed in the detailed description hereinafter.

DETAILED DESCRIPTION

Figure 1:
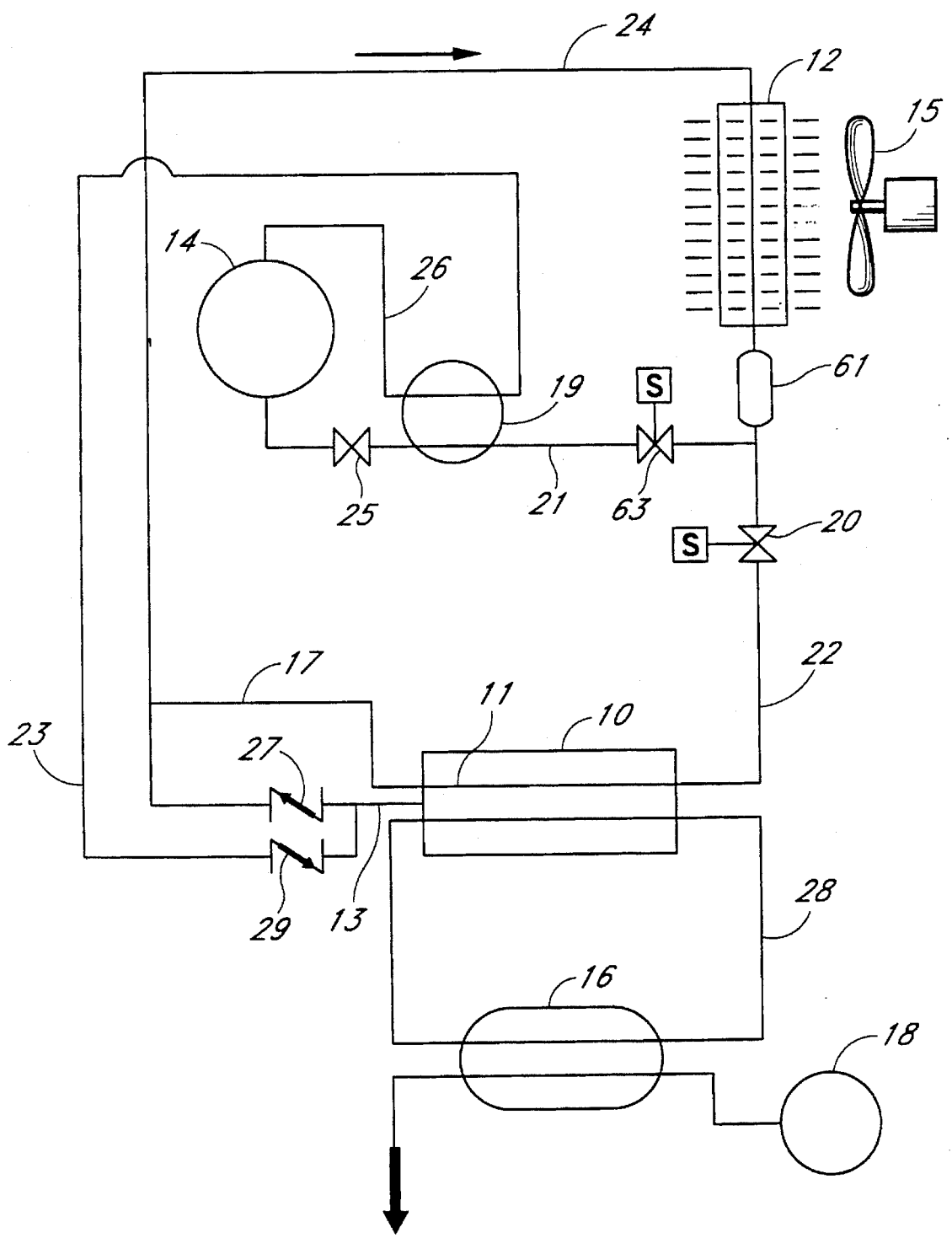
FIG. 1 is a schematic illustration of a single stage furnace and heating system of the invention.

The heating and air conditioning systems of the invention incorporate and utilize solid-vapor sorption reactors containing a complex compound formed by sorbing a polar gas on a metal salt and in which the adsorption reaction has been carried out by restricting the volumetric expansion of the complex compound formed. The polar gas or refrigerant used in the chemisorption reactions is capable of forming a covalent-like coordinative bond with the salt. The complex compounds are those disclosed in U.S. Pat. No. 4,848,994, the description of which is incorporated herein by reference, as are those described in the aforesaid incorporated patents and co-pending applications. The preferred polar gaseous reactants are ammonia, water, lower alkanols ($C_1$–$C_5$), alkylamines, and polyamines. Sulfur dioxide, pyridine and phosphine may also be used. Preferred metal salts include the nitrates, nitrites, perchlorates, oxalates, sulfates, sulfites and halides, particularly chlorides, bromides and iodides of alkali metals, alkaline earth metals, transition metals, particularly chromium, manganese, iron, cobalt, nickel, copper, tantalum and rhenium, as well as zinc, cadmium, tin and aluminum. Double metal chloride or bromide salts, in which at least one of the metals is an alkali or alkaline earth metal, aluminum, chromium, copper, zinc, tin, manganese, iron, nickel or cobalt are also useful. Another salt of special interest is $NaBF_4$. Other useful complex compounds are disclosed in U.S. Pat. Nos. 5,186,020 and 5,263,330 and are incorporated herein by reference. Preferred complex compounds used in the reaction of the invention are the following or comprise adsorption/desorption compositions containing at least one of the following as a component:

TABLE

| Complex Compound | X Value |
| --- | --- |
| $SrCl_2 \cdot X(NH_3)$ | 0-1, 1-8 |
| $CaCl_2 \cdot X(NH_3)$ | 0-1, 1-2, 2-4, 4-8 |
| $ZnCl_2 \cdot X(NH_3)$ | 0-1, 1-2, 2-4, 4-6 |
| $ZnBr_2 \cdot X(NH_3)$ | 0-1, 1-2, 2-4, 4-6 |
| $ZnI_2 \cdot X(NH_3)$ | 0-1, 1-2, 2-4, 4-6 |
| $CaBr_2 \cdot X(NH_3)$ | 0-1, 1-2, 2-6 |
| $CoCl_2 \cdot X(NH_3)$ | 0-1, 1-2, 2-6 |
| $CoBr_2 \cdot X(NH_3)$ | 0-1, 1-2, 2-6 |
| $CoI_2 \cdot X(NH_3)$ | 0-2, 2-6 |
| $BaCl_2 \cdot X(NH_3)$ | 0-8 |
| $MgCl_2 \cdot X(NH_3)$ | 0-1, 1-2, 2-6 |
| $MgBr_2 \cdot X(NH_3)$ | 0-1, 1-2, 2-6 |
| $MgI_2 \cdot X(NH_3)$ | 0-2, 2-6 |
| $FeCl_2 \cdot X(NH_3)$ | 0-1, 1-2, 2-6 |
| $FeBr_2 \cdot X(NH_3)$ | 0-1, 1-2, 2-6 |
| $FeI_2 \cdot X(NH_3)$ | 0-2, 2-6 |
| $NiCl_2 \cdot X(NH_3)$ | 0-1, 1-2, 2-6 |
| $NiBr_2 \cdot X(NH_3)$ | 0-1, 1-2, 2-6 |
| $NiI_2 \cdot X(NH_3)$ | 0-2, 2-6 |
| $SrI_2 \cdot X(NH_3)$ | 0-1, 1-2, 2-6, 6-8 |
| $SrBr_2 \cdot X(NH_3)$ | 0-1, 1-2, 2-8 |
| $SnCl_2 \cdot X(NH_3)$ | 0-2.5, 2.5-4, 4-9 |
| $SnBr_2 \cdot X(NH_3)$ | 0-1, 1-2, 2-3, 3-5, 5-9 |
| $BaBr_2 \cdot X(NH_3)$ | 0-1, 1-2, 2-4, 4-8 |
| $MnCl_2 \cdot X(NH_3)$ | 0-1, 1-2, 2-6 |
| $MnBr_2 \cdot X(NH_3)$ | 0-1, 1-2, 2-6 |
| $MnI_2 \cdot X(NH_3)$ | 0-2, 2-6 |
| $CaI_2 \cdot X(NH_3)$ | 0-1, 1-2, 2-6, 6-8 |
| $CrCl_2 \cdot X(NH_3)$ | 0-3, 3-6 |
| $LiCl \cdot X(NH_3)$ | 0-1, 1-2, 2-3, 3-4 |
| $LiBr \cdot X(NH_3)$ | 0-1, 1-2, 2-3, 3-4 |
| $NaCl \cdot X(NH_3)$ | 0-5 |
| $NaBr \cdot X(NH_3)$ | 0-5.25 |
| $NaBF_4 \cdot X(NH_3)$ | 0.5-2.5 |
| $NaI \cdot X(NH_3)$ | 0-4.5 |
| $K_2FeCl_5 \cdot X(NH_3)$ | 0-5, 5-6, 6-11 |
| $K_2ZnCl_4 \cdot X(NH_3)$ | 0-5, 5-12 |
| $Mg(ClO_4)_2 \cdot X(NH_3)$ | 0-6 |
| $Mg(NO_3) \cdot X(NH_3)$ | 0-2, 2-4, 4-6 |
| $Sr(ClO_4)_2 \cdot X(NH_3)$ | 0-6, 6-7 |
| $CrBr_3 \cdot X(NH_3)$ | 0-3 |
| $CrCl_2 \cdot X(NH_3)$ | 0-3, 3-6 |
| $VCl_3 \cdot X(NH_3)$ | 0-3, 3-5, 5-6, 6-7, 7-12 |
| $AlCl_3 \cdot X(NH_3)$ | 0-1, 1-3, 3-5, 5-6, 6-7, 7-14 |
| $CuSO_4 \cdot X(NH_3)$ | 0-1, 1-2, 2-4, 4-5 |

Especially preferred are any of the $CaCl_2 \cdot X$ ($NH_3$) complexes, $SrCl_2 \cdot 1$-8 ($NH_3$), $SrBr_2 \cdot 2$-8 ($NH_3$), $CaBr_2 \cdot 2$-6 ($NH_3$), $CaI_2 \cdot 2$-6 ($NH_3$), $FeCl_2 \cdot 2$-6 ($NH_3$), $FeBr_2 \cdot 2$-6 ($NH_3$), $FeI_2 2$-6 ($NH_3$), $CoCl_2 \cdot 2$-6 ($NH_3$), $CoBr_2 \cdot 2$-6 ($NH_3$), $MgCl_2 \cdot 2$-6 ($NH_3$), $MgBr_2 \cdot 2$-6 ($NH_3$), $MnCl_2 \cdot 2$-6 ($NH_3$) and $MnBr_2 \cdot 2$-6 ($NH_3$), and mixtures thereof.

According to the invention, solid-gas sorption reactions, i.e., adsorption and desorption of the gas on the solid, are carried out under conditions and in apparatus intended to yield high power densities. Such reactions are preferably capable of achieving maximum power density per mass to adsorbent, maximum power density per mass of reactor and maximum power density per desired or needed reactor volume. Half-cycle times, i.e., adsorption or desorption reaction times of the reactions having improved reaction rates according to the present invention are carried out, at least for one of the adsorption or desorption phases, in less than 60 minutes, generally less than 30 minutes, preferably in less than about 20 minutes and typically between about 3 and about 15 minutes. It will be understood that not all applications require identical times for adsorption and desorption, and in some cases, one or both reactions may be as short as about 2 minutes, while in other cases, one of the reactions may extend a few minutes beyond 30 minutes. Moreover, during part load conditions, when the equipment is not expected to produce its full heating capacity, refrigeration, cooling or power, reaction times may be extended in order to limit the inherent process cycling and avoiding unnecessary thermal losses. It will be understood that total cycles or full cycle time periods also require a time period for adjusting or changing pressure between adsorption and desorption half-cycles. Thus, a full cycle time period comprises the sum of the half-cycle times plus two pressure-temperature adjustment times, the latter typically each of a few seconds, up to a few minutes.

Optimum reaction rates are dependent on a number of independent parameters including adsorbent density, the mass diffusion path length, the heat or thermal diffusion path length, as well as the thermodynamic operating conditions. The latter include the overall process conditions i.e., the specific temperature and pressure conditions in which the process is carried out, the differential pressure or $\Delta P$, i.e., the difference between the operating or system pressure and the equilibrium pressure of the complex compound, and the approach temperature or $\Delta T$, which is typically greater than 8° K for at least one of the adsorption or desorption reactions. Finally, the parameter of the specific salt and the complex compounds formed between the salt and a specific selected polar gas must be considered, it being understood that the characteristics of such salts and the resulting complex compounds, including the equilibrium pressures thereof, are important determinations in balancing the aforesaid parameters to optimize reaction conditions and achieve a system having maximized reaction rates. As sometimes used herein, the term "optimized reaction product" or "optimized complex compound" is a complex compound in which the polar gas sorption process on the metal salt is carried out under process conditions resulting in a complex compound reaction product having the aforesaid characteristics leading to an economic optimum.

Each reaction chamber or reactor module has dimensions which provide basis for measuring or determining the thermal diffusion path length (heat transfer) and the mass diffusion path length (mass transfer), respectively. The thermal path length is the distance from a highly thermally conductive surface to the center of the mass of complex compound. A heat conductive fin is an example of such a thermally conductive surface. In this example thermal diffusion in a given reactor is primarily a function of the fin count, i.e., the number of fins per unit of length (height) of the reactor modules. The greater the number of fins per unit of reactor length, the better the thermal diffusion and the less the thermal diffusion path length. The thermal diffusion path is the path from the most distant particle of complex compound to the nearest heat conductive surface. Thus, the simplified thermal path length is one-half the distance between two adjacent fins or plates. According to the invention, the thermal diffusion path length is less than 4.5 mm, preferably about 4 mm or less, and more preferably about 3.0 mm or less. Utilizing a group of preferred salts disclosed herein the most preferred thermal path length is between 0.6 and 3.2 mm. This is also equivalent of a fin count of at least 4 fins per inch, and preferably from about 9 to 25 fins per inch (1.4 mm to 0.5 mm thermal path length), or higher if practical for manufacture, for optimized power density requirements. The preferred thermal path length ranges for some specific salts are disclosed in aforesaid application Ser. No. 104,427. It will be understood that such a simplified path length determination does not take into consideration the tube wall, although that surface is also a contributor to the thermal path. Typical suitable and practical fin thickness will vary from about 0.07 mm to about 2 mm. Where thermal diffusion path lengths are relatively short, less fin thickness is usually preferred. The fin thickness is typically set to give a small temperature drop or rise in the fin as compared to desorption or adsorption approach temperature. The determination or measurement of the thermal path length can be readily determined for any three dimensional reaction chamber.

The size and shape of the fins or heat exchanger or thermal conducting surfaces is based on common heat transfer calculations understood by those skilled in the art. For example, the reactor may incorporate a plurality of heat exchange surfaces, fins or plates extending vertically radially along a heat exchange fluid conduit. Reactors of this type are illustrated in the aforesaid U.S. Pat. No. 5,298,231 and application Ser. No. 104,427. In this example the distance between the fins or plates varies because of the wedge-like shape of the different reaction chambers between adjacent plates which are not parallel. However, the average distance between two adjacent plates will be measured at a point halfway between the inner and outer edges of the respective plates. In reactors of a design in which fin height is quite low or small, or in which the fin count is low, the proximity of a salt or complex compound molecule to a prime heat transfer surface such as tubes or plates also becomes important in determining the thermal path length. Measurement and determination of the thermal path length may be made regardless of the shape or size of the adjacent solid in or reaction chamber wall surfaces extending from and in thermal communication with the heat exchange conduit or conduits extending through the reactor. Such heat exchange surfaces, walls, plates or fins also usually comprise the gas impermeable reactor module walls which define or form the reaction chamber or chambers within the reactor. The reactor core may also comprise a tube fin reactor utilizing multiple tubes for directing heat transfer fluids through the reactor in thermal contact with the adsorption layer confined between the plates or fins and a gas permeable wall. This and other reactor examples are shown and described in the aforesaid application Ser. No. 104,427.

Although thermal diffusion path length is a highly important parameter, as set forth above, the mass diffusion path length, i.e., the path length of a refrigerant molecule to and from an adsorption particle or molecule, is also quite critical in reactors or reaction chambers in which the density of the reaction product mass has been controlled by limiting the volumetric expansion, according to the present invention. In order to achieve the high reaction rates according to the present invention a reactor or reaction apparatus must be designed for the capability of moving a substantial amount of refrigerant within the adsorbent mass in a relatively short period of time. For this reason, the mass diffusion path length of the reactor is of utmost importance. The mass diffusion path length is determined by measuring the distance between the point or surface of entry of the gas into the adsorbent mass (reaction chamber or module) to the opposite end or wall of the chamber, which represents the greatest distance the gas must travel to and from molecules or particles of complex compound during adsorption and desorption cycles. This dimension is readily determined for any reaction chamber size or shape. However, the important consideration in determining the desirable, preferred or optimized mass diffusion path lengths must take into account the entire mass of adsorbent particles relative to gas distribution means, i.e., port, vent, etc., from which the gas is directed into and from the adsorbent mass within the reaction chamber. It is also to be understood that the flow of refrigerant through the sorbent mass, to and from the adsorption sites, is not simply based on gas permeability or penetration through a porous medium, nor is it based only on gas penetration through a dense product mass contained in a limited volume. Instead, in the present chemisorption reaction process, the complex compound adsorbent changes its properties throughout the process as it coordinates and adsorbs the gas molecules. Since the coordination is typically a polar gas adsorbed on the complex compound in one or more coordination spheres, sorption rates are impacted by both the coordination site coverage and by the shielding resulting from accumulation of coordinated polar gas molecules facing incoming polar gas molecules during adsorption. Accordingly, the mass flow path length or mean mass diffusion path becomes extremely important and critical to achieving high reaction rates and power density according to the invention. Thus, in any reactor, not only is a maximum mass transfer distance to an adsorbent particle to be considered, but also the average or mean distance the gas must travel to and from all particles of the mass. As used herein, the term mean mass diffusion path length or distance is defined as the arithmetic mean over all particles of the shortest distance from every particle to a gas permeable surface bordering the compound, gas distribution inlet, outlet or other gas distribution means. Thus, the mean mass diffusion path length=

$$\frac{\sum_{i=1}^{n} d_i}{n}$$

where $d_i$=shortest distance from $i^{th}$ particle to a gas permeable surface and n=number of particles.

According to the invention, for rapid adsorption and desorption reactions sorbing a substantial amount of the theoretically available refrigerant coordination sphere in less than about 30 minutes and preferably less than 20 minutes, for at least one of the adsorption or desorption cycles, the mean mass diffusion path length is less than 15 mm, and preferably about 13 mm or less and more preferably less than 8 mm. In order to meet this critical requirement, the reactor or reaction chamber or chambers of the apparatus in which the adsorbent is present and the gas distribution components, i.e., tubes, reactor walls, channels, inlets, ports, vents etc., are preferably designed so that the mean mass diffusion path as defined above, in such a reactor is 15 mm or less. For the group of preferred salts disclosed herein, the most preferred mean mass diffusion path length is between 3 and 7 mm. It also preferred in the reactors or reaction chambers that at least 60% of the metal salt or the complex compound, by weight, is within 25 millimeters or less of a gas distribution means. The specific preferred mean mass diffusion path length range for some specific salts is disclosed in application Ser. No. 104,427.

From the above, it will be evident that both the thermal and mass diffusion path lengths may be changed or varied by selecting or designing a reactor having reaction chambers (modules) of desirable fin depth and reaction chamber height dimensions. An increase of the fin count, or number of fins per unit length of the reactor, will increase the system thermal conductivity and reduce the thermal path length. Likewise, the mass diffusion path length may be selected by selecting or designing a reactor having a greater or smaller distance between the gas permeable means through which the gaseous reactant passes during the alternate adsorption and desorption reaction phases, and the opposite end of the reaction chamber. For example, additional slots, gas tubing or gas permeable materials such as fire brick, porous cement, porous plastics, sintered metals or ceramics, wire mesh, etc., may be used in reactor assembly design for increasing gas inlet and outlet exposure for reducing mass diffusion path lengths. In designing or selecting reactors and reaction chamber configurations, these two independent parameters may be considered and selected to give a reactor having the reaction chambers of the desired heat diffusion and mass diffusion path lengths giving optimum or preferred reaction rates. Accordingly, optimum reactors capable of achieving desired reaction rates and power density according to the invention will have both thermal (heat) and mass diffusion path lengths as set forth above.

In designing reactor cores for optimizing the reactor module or reaction chamber dimensions pursuant to the invention, although relatively short gas diffusion paths are desirable from a reaction rate standpoint, the weight ratio of heat exchanger hardware to adsorbent may become prohibitive. In order to balance these features, the following principals may be applied. The heat transfer surface extension may be made of a thermally conductive and gas permeable material having less gas flow resistance than is encountered in the complex compound. For such an advantage the reactor core fin plates themselves may be designed to conduct gas through the fin or plate surface directly to the layer of adsorbent on each side of or otherwise in contact with the fin plate. Examples of suitable fin plate material include sintered and powdered metals, metal foams, or highly conductive non-metal ceramics or other porous materials. Utilizing such fin plates for both heat transfer and gas distribution, the mass transfer distance described above would no longer apply, since the distance between adjacent fins or plates would become both the heat and mass transfer path distance to be considered. Secondly, where the use of gas permeable reactor fin plates for both heat and mass transport is not desirable, gas permeable components or materials spaced between reactor fin plates may be used. Such gas permeable materials which are compatible with the solid reactant and gaseous refrigerant offer low gas resistance, and substantially enhance and contribute to increased gas distribution throughout the solid adsorbent.

A third means for increasing gas diffusion through the complex compound is by using a gas permeable or porous material added to the salt, with the mixture then being introduced into the reactor core. Of particular interest are materials which may be mixed with the adsorbent salt and which have geometries that offer a directional flow for gas through the salt and complex compound mass. Such materials are referred to herein as gas directional flow admixture components or gas distribution admixture compositions. These materials may be used to enhance the overall gas or refrigerant transport to and from the sorption sites of complex compounds or mixtures which contain complex compounds and comprise components having elongated or extended microporous surfaces such as micro-tubes or other suitable geometries of materials that are gas permeable and have a gas transport resistance lower than the complex compound adsorbent during adsorption and/or desorption. Further description and explanation of such materials are disclosed in application Ser. No. 104,427 and are incorporated herein by reference.

Another parameter to be determined is the mass of salt per unit volume of reaction chamber cavity, or loading density of the solid particulate metal salt introduced into the reactor and the optimum density of the resulting complex compound reaction product to achieve the optimum or desired reaction rates or power densities for adsorbing and desorbing the gaseous reactant to and from the complex compound. In order to achieve the desired or optimum density of the complex compound in a reactor having a fixed volume, the amount or volume of unreacted salt introduced into the reaction chambers must be sufficient so that when the complex compound reaction mass structure is produced during the sorption process reaction, the volumetric expansion results in each reaction chamber or module being filled with the newly formed complex compound structure composition having the desired density. Normally, the density of the complex compound formed will be lower than the density of the salt before the initial reaction, although the density of a fully adsorbed complex compound is often higher. The density of the complex compound, will also vary depending on the operating conditions, i.e., pressure and temperature. Each salt and complex compound will react somewhat differently at different temperatures and pressures. Thus, such operating conditions, as well as the equilibrium pressure of the complex compound and the approach pressure, must be considered. Accordingly, the optimized density for each complex compound under such operating conditions must also be independently determined. According to the invention, the loading density of the adsorbent salts for reacting with ammonia in the heat exchanger cavity is preferably between about 0.2 and 1.0 g/cc, and more preferably between about 0.3 and 0.8 g/cc but for salts having a high bulk or pour density, the loading density may exceed 1 g/cc in particular for adsorbents of relatively high molecular weight. However, according to the invention, these density ranges must also take into account the above disclosed heat and mass transfer parameters. Thus, the selection of a salt density within the aforesaid limits is to be used in a reactor or reaction chamber having a thermal diffusion path length, and/or a mass diffusion path length as set forth and described hereinabove. Preferred loading density ranges, mass diffusion path lengths and thermal diffusion path lengths for certain specific salts used with ammonia refrigerants are shown in Table I of the aforesaid application Ser. No. 104,427 and which information is incorporated herein by reference.

Specific improvements in the reaction rates by optimizing the heat diffusion and mass diffusion path lengths and the complex compound density result in substantial improvements and increase in the reactor economics. This improvement substantially impacts on the efficiency of the complex compounds and concomitantly, the amount of energy which can be provided by the system or apparatus in a given reaction cycle period. For example, in some equipment applications reaction rates of approximately 10–15 moles/ mol-hr. imply half-cycle periods of about ten to twelve minutes, i.e., a ten minute time required for adsorbing or desorbing the desired amount of gaseous ligand from the complex compound. By comparison, reaction rates of 25 to 35 moles/mol-hr. imply half-cycle periods of about five to seven minutes, thereby approximately doubling the energy available from such a system for a given time period of operation. The high reaction rates obtained by using the optimized reactors as previously described are capable of being sustained not only for short cycle periods, but over periods of up to 20 minutes, or more. Thus, reaction rates of above 6 moles/mol-hr, typically 10–20 moles/mol-hr may be sustained for at least 6 minutes, typically up to 12–15 minutes and for some reactions up to 20–30 minutes. The aforesaid reaction rate figures are averages, based on the average of the reaction rates up to the time when the reaction is complete or otherwise terminated.

Reactors of the invention, in which the volumetric expansion of the complex compounds is restricted during the sorption process reactions are capable of taking up, i.e., adsorbing and desorbing, at least 0.02 gram (20 milligrams) of $NH_3$ per minute and per cc of expanded adsorbent where reaction times are 30 minutes or less. Moreover, where the reaction times are limited to 30 minutes or less, such reactors are capable of taking up 0.01 gram (10 milligrams) of $NH_3$ per minute per cc of total reactor enclosure volume, i.e., within the total volume of the pressurized reactor enclosure, such process may be limited by possible early completion of the sorption if saturation is obtained in less than 30 minutes.

Reaction rates are typically dependent upon the degree of reaction completion. Equations of the form $$\Delta N = \Delta N_{max}(1-e^{-kt})$$

where:

$\Delta N$=reaction extend (moles/mole)

$\Delta N_{max}$=maximum reaction extent (moles/mole)

t=time (sec)

k=reaction kinetics value ($sec^{-1}$) (k is called herein reaction constant)

can be used to describe reaction progress over time. The above equation is put in a terminology and units useful for complex-compound sorption reactions of the present invention. The reaction constant k describes the time dependency of reaction progress for any time. Reaction rates can be obtained from an expression involving k and time:

$$\text{rate (mole/mole} - \text{hr)} = \frac{\Delta N}{(t \times 3600)} = \Delta N_{max} \frac{(1-e^{-kt})}{(t \times 3600)}$$

with units again convenient for the sorption reactions as described herein. As an example of using these equations, $SrCl_2 \cdot NH_3$ can complex up to 7 moles of ammonia in the 1 to 8 step, so $\Delta N_{max}$ is 7. For a time of 6 minutes (360 seconds) and k value of 0.004 $sec^{-1}$, $\Delta N$ is 5.3 moles of ammonia per mole of salt. Reaction progression this far in 6 minutes requires an average rate over this 6-minute period of 53 moles/mole-hr. A reaction constant of 0.0004 gives $\Delta N$ of 0.94 in 6 minutes, or an average reaction rate of 9.4 moles/mole-hr. Given a reaction constant (k) for any sorber configuration with any salt, the extent of reaction completion and reaction rates at any time are readily determined. The actual amount of refrigerant adsorbed and rates do depend on the size of the sorption step, $\Delta N_{max}$. Sorption rates achievable by the present invention lead to the following minimum values for the reaction constant:

| $\Delta N_{max}$ | k |
|---|---|
| up to 4.5 moles/mole | 0.0004 |
| between 4.5 and 6 moles/mole | 0.0003 |
| above 6 moles/mole | 0.0002 |

Such reaction determinations are useful for adsorption and/ or desorption periods of less than about 30 minutes.

The reactivity of the salts may be further enhanced by initially adsorbing a small amount of a gaseous ligand on the salt, which additive ligand is different from the gaseous reactant to be used in the complex compound. Any of the aforesaid polar gaseous reactants may be used, and particularly preferred are ammonia, water, lower molecular weight aliphatic alcohols, amines or phosphine. The amount of the additive material is preferably between about 0.05% and about 10% by weight of the salt. The use of a hydrated salt containing a small but effective amount of water adsorbed on the salt may be satisfactory for such a purpose.

In FIG. 1 there is illustrated schematically a single reactor heating system embodiment of the invention. In the single reactor system, reactor 10 comprises one or more reaction chambers containing one or a mixture of the aforesaid complex compounds which have been formed according to the previously described method of restricting the volumetric expansion and controlling the density of the complex compound formed during adsorption of the polar gas on the metal salt. The construction of the reactor including the interior reaction chambers or cores, the relative positioning or location of the fins for achieving the desired thermal and mass diffusion path lengths, fin thickness and shapes as well as the description of the means for directing the refrigerant gas into, through and from the reaction chambers are disclosed in the aforesaid application Ser. No. 104,427, and U.S. Pat. Nos. 5,328,671 and 5,298,231 and are incorporated herein by reference. The reactor also contains a heat transfer section 11 by which heat transfer fluid and refrigerant or heat transfer fluids are thermally exposed to the complex compound for heating and cooling thereof during desorption and adsorption, respectively. The system shown also includes a burner 18 for directing hot gases of combustion to boiler 16 for heating water or other heat transfer fluid to be directed via conduit 28 to the heat transfer section of reactor 10. The system also includes a condenser 12 and evaporator 14 for condensing and evaporating, respectively, the polar gas refrigerant. In the embodiment shown, condenser 12 is a forced convection type condenser cooperating with fan 15 for providing space heat typically for heating a room or rooms by forced air heated as it is directed over the heat transfer surfaces of the condenser. However, other condensers may be used and combined with a hydronic loop apparatus for hot water heaters, radiators, and other heating apparatus embodiments as will be disclosed hereinafter. Thus, the forced convection condenser 12 shown in the embodiment of FIG. 1 is only an example of the use of heat from a condenser of the system, and the invention is not limited to the example shown.

Evaporator 14 is located outdoors for absorbing thermal energy where such energy is not to be used, i.e., where an evaporator cooling function is not used. Conduit 21 directs condensed refrigerant via thermostatic expansion valve 25 to evaporator 14. The expansion valve may be replaced using any other equivalent component such as a throttle valve, capillary tube or other suitable refrigerant expansion device. In addition to the above-described examples, virtually all conventional refrigerant expansion devices may be used. Passive expansion devices such as capillaries or orifices are much more difficult to apply to very small ammonia systems, and are increasingly difficult with periodic adsorption systems. In addition to thermostatic expansion valves, constant pressure expansion valves and electronic expansion valves may be used. For pulse width modulated (on-off) electronic expansion valves used in very small refrigeration systems, it is useful to include a flow restriction (orifice or capillary) down stream of the valve, with controlled volume between the valve and the restriction. When the valve opens, this volume is filled and slowly bleeds to the evaporator. Required minimum pulse time of the valve is thus reduced. Conduits 26 and 23 direct polar gas from evaporator 14 to reactor 10 via one-way valve 29 and conduit 13. Polar gas desorbed from reactor 10 is redirected to condenser 12 via conduit 13, one-way valve 27 and conduit 24. The system shown also includes conduit 22 and solenoid valve 20 for selectively directing condensed refrigerant from condenser 12 to the heat transfer section 11 of reactor 10, and conduit 17 for directing vaporized refrigerant from the heat transfer section back to condenser 12 via conduit 24. Reservoir 61 receives and accumulates condensed refrigerant from condenser 12. An optional shut-off valve 63 may also be provided for selectively regulating the flow of refrigerant from the reservoir to the evaporator. Condenser 12 may also be designed to incorporate a reservoir function for accumulating condensed refrigerant.

Other means for heating the reactor for driving the desorption reaction in reactor 10 may include heating the complex compound by direct firing of the sorber tubes or using heat from hot gases of combustion from a burner, or the burner and boiler may be replaced by resistive heating elements. Alternatively, thermosyphon heating or heat pipes, well known to those skilled in the art, may be used to transfer heat to the sorber. Although a single reactor embodiment is illustrated, two or more reactors may be used and operated with one reactor desorbing polar gas refrigerant as the complex compound is heated, while the other reactor adsorbs the polar gas. The use of paired reactors operated in opposing half-cycles will provide a continuous supply of desorbed gaseous refrigerant to the condenser to facilitate continuous heating operations, especially if desorption periods are shorter than adsorption periods.

In operation of the single reactor embodiment shown, during the fired phase, to supply desorbed polar gas refrigerant to the condenser, hot gases of combustion from burner 18 are directed to boiler 16 producing hot water, steam or other heated heat transfer fluid which is directed via conduit 28 to the heat transfer section 11 of reactor 10. The heat transfer section of the reactor directs heat to the complex compound causing desorption of the polar gas which is directed via conduit 13, one-way valve 27 and conduit 24 to condenser 12, where it is condensed, producing heat used for the aforesaid heating purposes for which the system is designed. When the complex compound in the reactor has been desorbed to the desired extent or for a desired time, burner 18 is shut down and the adsorption phase is initiated. Adsorption of the polar gas refrigerant by the complex compound in the reactor commences when the complex compound is sufficiently cooled by condensed refrigerant directed to the reactor heat transfer section 11 by opening solenoid operated valve 20. Condensed gaseous refrigerant in the heat transfer section of reactor 10 is thermally exposed to the hot complex compound and thus is vaporized which cools the reactor. The vaporized refrigerant is directed from the reactor to the condenser via conduit 17 and 24. Such adsorption reactor cooling may use methods and apparatus components described in application Ser. No. 08/327,150, the descriptions of which are incorporated herein by reference. Once the reactor is sufficiently cooled by the vaporizing refrigerant in the reactor heat transfer section, the reduced vapor pressure of the salt or desorbed complex compound is low enough to begin drawing refrigerant vapor from the evaporator as the exothermic adsorption starts and continues until adsorption of the refrigerant gas on the sorbent is substantially completed. Circulation of the refrigerant through the condenser and reactor heat exchange section continues during the entire adsorption phase thereby maintaining the reactor near condenser temperature. Then, with the reactor again near condenser temperature, the solenoid valve 20 is closed, heat is supplied to the reactor via burner 18 and boiler 16, and the next desorption cycle begins.

In the embodiment shown, a heat exchanger 19 in the form of a liquid subcooler is used for transferring heat between the cold refrigerant vapor passing from evaporator 14 via conduits 26 and 23 to reactor 10 during the adsorption phase with hot condensed refrigerant from condenser 12 passing to the evaporator via conduit 21. The use of such a subcooler improves the efficiency of the system by cooling the hot condensed refrigerant against the cooler refrigerant vapor whereby a smaller fraction of the liquid will flash to vapor in isenthalpic expansion thereby increasing the capacity of the system. Moreover, such a subcooler increases the energy provided in the vapor stream from the evaporator to the adsorbing reactor thereby ultimately decreasing the amount of prime energy needed to drive the desorption reaction. Thus, capacity and COP of the system are increased by using such a subcooler.

As previously noted, a plurality of reactors may be used instead of a single reactor, with the operation proceeding substantially as described above except that the two reactors will be operated in substantially opposing phases or half-cycles. For continuous operation, it may also be desirable to operate a two or more reactor system with desorption carried out more rapidly than adsorption. Such operation will result in completion of the desorption phase earlier than completion of adsorption in an adsorbing reactor thereby providing continuous adsorption suction on the evaporator. Such operation reduces or eliminates the $\Delta T$ down-time, i.e., the time it takes the evaporator to recover from switching reactor half-cycles. To achieve such advantage, desorption is preferably carried out at least 10% faster than adsorption, and more preferably more than 25% faster than adsorption reaction time. The use of two condensers or two condenser sections may be advantageous to facilitate cool-down of the second desorbed sorber while the first sorber is still adsorbing, although one condenser could serve both functions as well.

The above-described single stage heat pump apparatus is suitable for providing domestic heating and/or cooling. The system is capable of providing usable condenser heat at between about 90° F. and about 160° F. and more typically between about 100° F. and 150° F. Again such heat may be used for water heaters, as well as space heating, directly or indirectly. The system may also be used to provide cooling by reversing the function of the condenser and evaporator components previously described. For such a function, suitable valving known to those skilled in the art (not shown in FIG. 1), will be switched for directing desorbed polar gas refrigerant from a reactor to evaporator 14, which will function as a condenser, from evaporator 14 to condenser 12, which will function as an evaporator, and to the reactor (or reactors) for adsorption. As adsorption occurs, suction of the gas from the acting evaporator 12 will provide cooling as the refrigerant is evaporated. Switching of heat exchanger functions or duties can also be achieved by external means, i.e., a valved heat transfer loop connecting the indoor and outdoor coils with the evaporator and condenser as required by the cooling/heating load of the building. Such a feature is of particular interest in dual utility applications such as summer cooling with the simultaneous production of hot water using heat from the condenser. The internal switching may also be used for dual duty applications incorporating a heat transfer loop for transporting heat between the hot water and the heat exchanger then acting as a condenser. It is also of particular advantage to use superheat harvested from the condenser or from a separate desuperheater (not shown) for heating water to achieve hotter water than otherwise possible using only phase change condensation. Use of combustion exhaust heat is also possible to boost the hot water temperature especially if the use of such heat is not or is already at its practical limit for providing combustion air pre-heating. Use of exhaust heat, superheat and plumbing to provide space heating and/or water heating, and space cooling and/or water heating, or water heating only is known to those skilled in the art and is within the purview of the invention.

It is to be understood that the refrigeration or cooling efficiency of such a single stage system is somewhat limited. For the single stage apparatus described above, the most preferred complex compounds are $SrBr_2 \cdot 2-8$ $(NH_3)$, $CaBr_2 \cdot 2-6$ $(NH_3)$, $FeCl_2 \cdot 2-6$ $(NH_3)$, $COCl_2 \cdot 2-6$ $(NH_3)$, $MnCl_2 \cdot 2-6$ $(NH_3)$, and $FeBr_2 \cdot 2 \cdot 6$ $(NH_3)$. Other useful compounds include $SrCl_2 \cdot 1-8$ $(NH_3)$, $CaCl_2 \cdot 2-4$ $(NH_3)$, $LiCl \cdot 0-3$ $(NH_3)$, $NiCl_2 \cdot 2-6$ $(NH_3)$, $CoBr_2 \cdot 2-6$ $(NH_3)$, $MgCl_2 \cdot 2-6$ $(NH_3)$, $MgBr_2 \cdot 2-6$ $(NH_3)$, $MnBr_2 \cdot 2-6$ $(NH_3)$, $CaI_2 \cdot 2-6$ $(NH_3)$, $FeI_2 \cdot 2-6$ $(NH_3)$, $CuSO_4 \cdot 2-4$ $(NH_3)$, $SnCl_2 \cdot 0-2.5$ $(NH_3)$, $NaBF_4 \cdot 0.5-2.5$ $(NH_3)$, $NaBr \cdot 0-5.25$ $(NH_3)$ $CaCl_2 \cdot 0-1$ $(NH_3)$, $CaCl_2 \cdot 1-2$ $(NH_3)$ and mixtures thereof.

Figure 2:
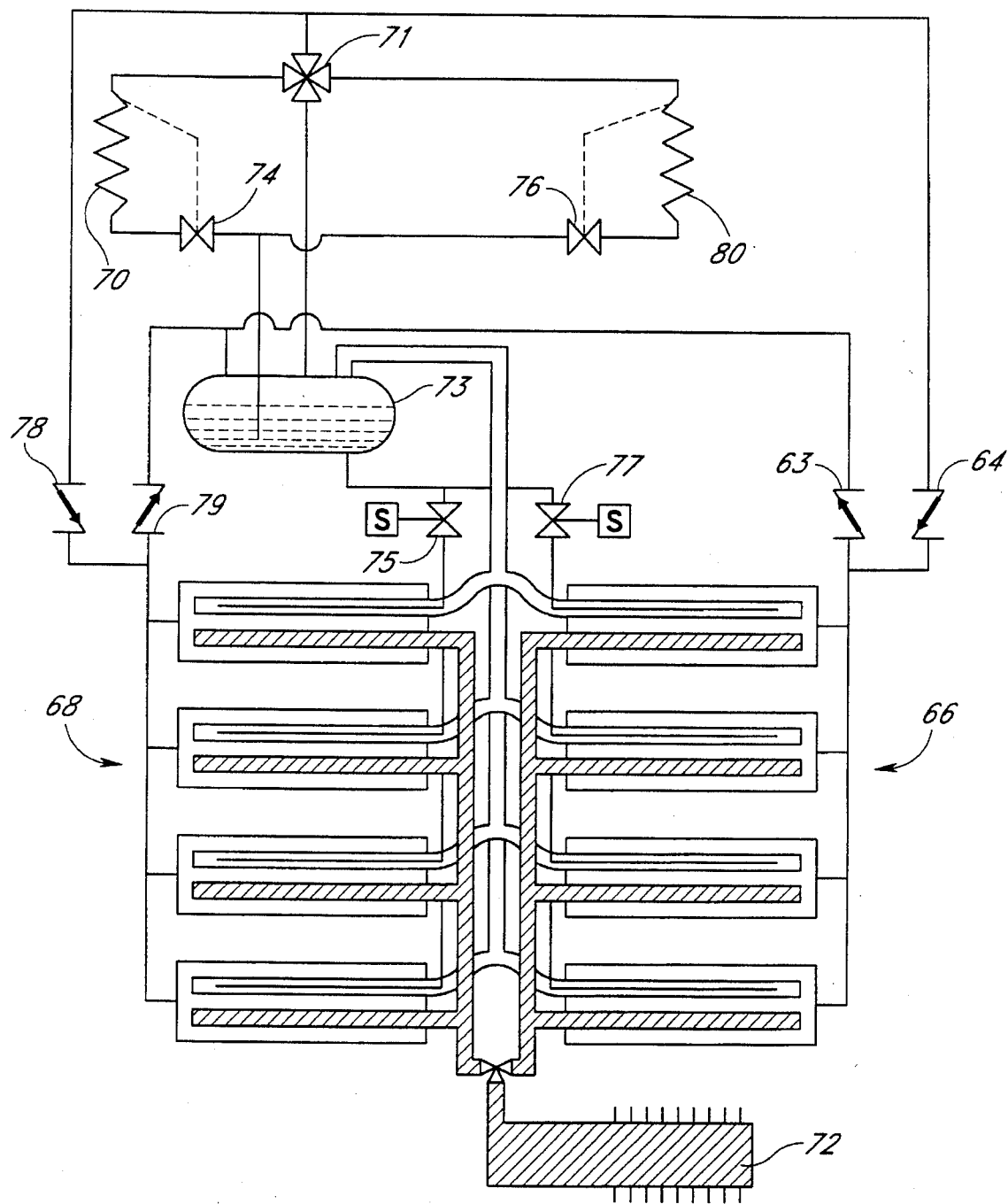
FIG. 2 schematically illustrates an example of a two sorber-bank heat pump including a reversing valve for selective heating and cooling operation.

FIG. 2 shows an example of a system acting as a heat pump and incorporating two banks of reactors 66 and 68 and including a reversing valve 71 for selecting heat exchanger function to provide heating and/or cooling. The respective banks of reactors desorb and adsorb refrigerant in alternating and opposite cycles as described in the aforesaid patents and applications. A boiler 72, which may be gas, oil or electric fired, heats each of the reactor banks for driving the exothermic desorption of the refrigerant from the complex compounds in the sorber/reactors. The heat exchange sections of the sorbers are also cooled to initiate adsorption and during adsorption using condensed refrigerant from reservoir 73 and by selectively operating the valves 75 and 77, each for directing the liquid refrigerant to a different bank of sorbers. Heat exchange coils 70 and 80 of evaporator/condenser components are shown. Heat exchange coil 70 is located indoors and heat exchange coil 80 is located outdoors. One-way valves 78, 79, 63, and 64 direct refrigerant to and from the bank of reactors. By operating reversing valve 71, heating or cooling is selectively provided by indoor heat exchanger coil 70 for space or water heating or cooling. Thermostatic expansion valves 74 and 76 are also shown. Reversing the cycle, i.e., reversing the heating and cooling function of the system, requires a capability to control refrigerant flow to either coil (whichever coil is functioning as the evaporator) while allowing free return of condensate for the other coil. There are several ways of accomplishing this. For example, a second 4-way valve could be used which allows the condenser to drain to the reservoir and which also directs refrigerant from an expansion valve to the evaporator. Another method is the use of checkflowrators (see components 65 and 67 in the system of FIG. 3) which are check valves having an orifice in the valve plug. Such valves restrict flow in one direction, and provide free flow in the opposite. Thus, condensate flows freely from the condenser while liquid refrigerant flow to the evaporator is controlled by an orifice. Yet another method comprises the use of two thermostatic expansion valves (TXVs) as shown in FIG. 2 which can be of the electrical or mechanical type. The condenser always has superheat at the inlet end where the TXV sensor is attached, whereby the TXV opens and allows free flow from the condenser to the reservoir. The bulb on the opposite coil controls superheat of the exiting vapor, as desired for control of refrigerant flow to the evaporator. However, it is to be understood that the invention is not limited to the above-described examples of cycle reversing and refrigerant flow controlling devices and other suitable and equivalent means may be used. A subcooler of the type illustrated in FIG. 1 may also be added as may combustion air pre-heater heat exchangers.

Figure 3:
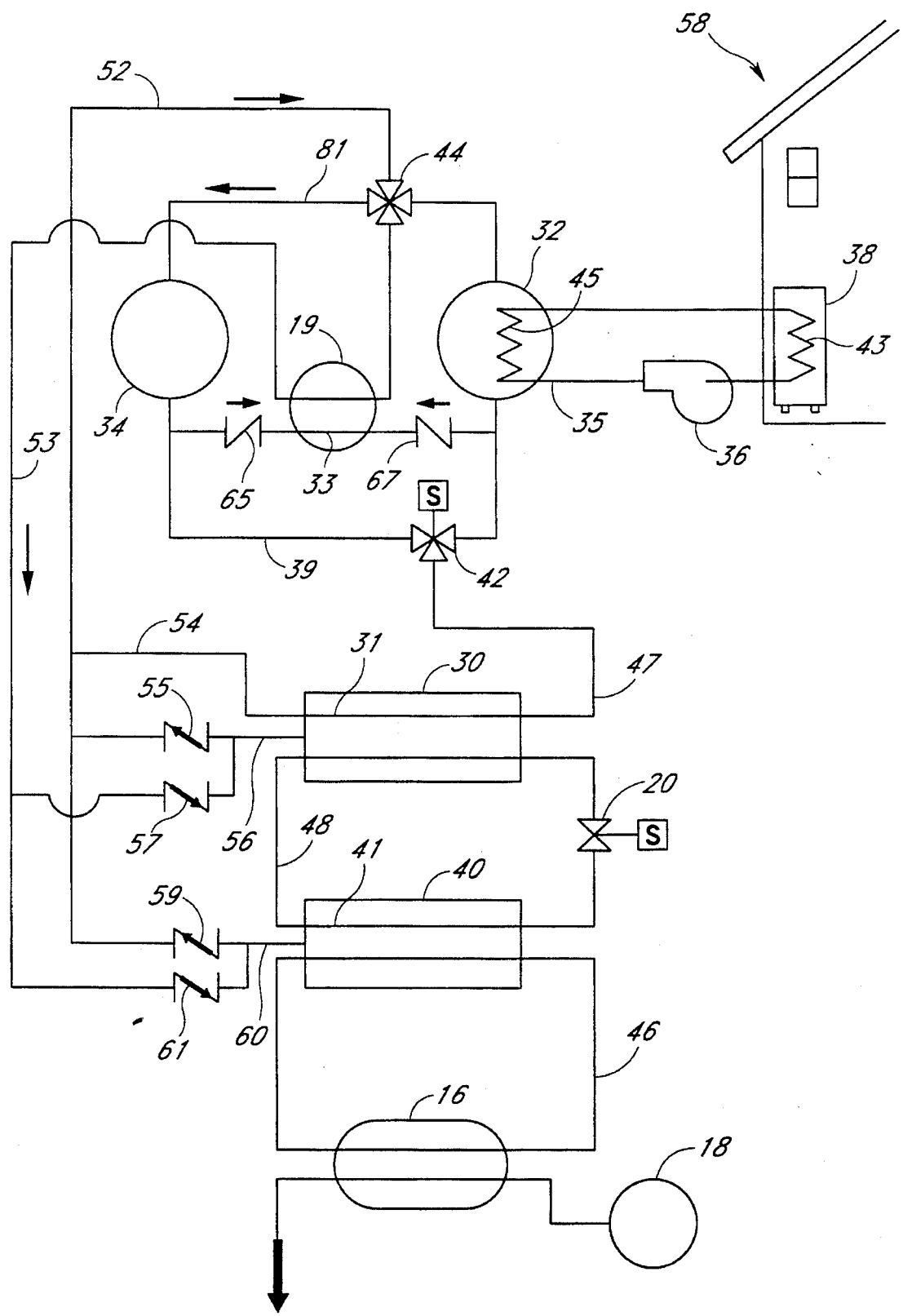
FIG. 3 is a schematic illustration of a two stage heat pump apparatus of the invention.

In FIG. 3 there is illustrated a two reactor embodiment of the invention utilizing two stage constant pressure engine staging for higher efficiency. In the system schematically shown first reactor 30 contains a first complex compound and the second reactor 40 contains a different, second complex compound resulting in adsorption and desorption temperature differences between the reactors. In such an apparatus, the different complex compounds of the two reactors are staged by directing the heat of adsorption from the second complex compound in the higher temperature sorber 40 to drive desorption of the complex compound in the lower temperature sorber 30. Such constant pressure engine staging (CPES) is described in U.S. Pat. Nos. 5,079,928 and 5,263,330, the descriptions of which are incorporated herein by reference. The different complex compounds are selected such that the temperature of adsorption of the lower stage, low vapor pressure compound at low reaction pressure (adsorption) in reactor 40 is at least 8° C. higher than the desorption temperature of the higher stage, high vapor pressure compound at high reaction pressure (desorption) in reactor 30. In the apparatus shown conduit 48 and solenoid operated valve 20 direct a heat transfer fluid, different from the refrigerant, for interstage heat transfer between the reactors. As in the previously described embodiment, the low temperature sorber 30 is cooled during adsorption with condensed refrigerant.

The system also includes a burner 18 and a boiler 16 for providing a heat transfer fluid such as steam, hot water, etc. via conduit 46 for heating and driving the desorption in the higher temperature sorber 40 with the fluid directed into the heat transfer section 41 thereof. Again, staging is provided between the reactors by directing a heat transfer fluid from the higher temperature sorber 40 via pipe 48 during adsorption to provide heat to the lower temperature sorber 30 for driving desorption therein. The apparatus further includes evaporator-condenser components 32 and 34, each of which is capable of condensing polar refrigerant gas to create heat which may be used for heating a residence or commercial structure, water, or the like, and for evaporating condensed polar refrigerant to provide cooling to such structures or for any other intended uses. In the embodiment illustrated, a hydronic heating and cooling system is used for providing heating and/or cooling to a residence 58. Heat exchanger 45 is in heat transfer communication with evaporator-condenser 32 for heating or cooling heat transfer fluid pumped via conduit 35 with pump 36 to heating and cooling apparatus 38 within the residence 58 via heat exchanger 43. Evaporator-condenser 34 is positioned outside of the structure to be heated and cooled for absorbing or rejecting thermal energy. Such a system acts as a heat pump to selectively provide heating or cooling or cooling and water heating when desired. The preferred apparatus also includes a subcooler 19 as previously described for increasing the efficiency of the system for transferring heat between the colder refrigerant vapor and warmer condensed refrigerant.

Four-way valve 44 directs refrigerant gas from a desorbing reactor to either of evaporator-condenser components 32 or 34. Where cooling is to be provided, component 32 acts as an evaporator for evaporating refrigerant received from component 34, operating as a condenser. Four-way valve 44 directs refrigerant from a desorbing reactor to condenser 34, via conduit 81. Condensed refrigerant is directed to evaporator 32 via checkflowrators 65 and 67, conduit 33 and subcooler 19. With solenoid valve 42 open, a portion of the condensed refrigerant is directed via conduit 39 from condenser 34 to reactor 30 via conduit 47 to cool sorber 30 to initiate adsorption and for cooling the reactor during adsorption as liquid refrigerant is vaporized in heat transfer section 31 of the reactor. The vaporized refrigerant is directed back to condenser 34 through conduits 54, 52 and 31 via valve 44. Concurrently, during adsorption in low temperature sorber 30, higher temperature sorber 40 is desorbing as heat is supplied to reactor heat transfer section 41 from boiler 16 via conduit 46. Desorbed refrigerant from reactor 40 is directed via conduit 60, one-way valve 59, conduit 52 and four-way valve 44 to condenser 34. Gaseous refrigerant from evaporator 32 is directed to adsorbing reactor 30 via valve 44 through subcooler 19 and via conduit 53 and one-way valve 57. In the alternate half-cycle operation of the system, with higher temperature sorber 40 adsorbing, and lower sorber 30 desorbing, with solenoid valve 20 open, the heat of adsorption generated in reactor 40 heats a heat transfer fluid directed from the heat transfer section of reactor 40 to the heat transfer section 31 of reactor 30 via conduit 48, for driving the desorption reaction. Desorbed refrigerant in reactor 30 is directed via conduit 56, one-way valve 55, conduit 52 and four-way valve 44 to acting condenser 34. Where the heat pump operates to provide heat to residence 58, four-way valve 44 is switched for reversing the functions of evaporator-condensers 32 and 34 while the adsorption and desorption functions of the reactors is carried out as previously described. Again, switching of heating and cooling functions may be by external fluid loop valving known to those skilled in the art. In applications where dual duty, e.g., heating of water and space cooling, is required, the condenser must have a heat transfer connection to the hot water with optional use of desuperheater and flue gas heat exchanger for heat recovery.

Preferred low vapor pressure, higher temperature complex compounds are $SrCl_2 \cdot 1$–8 $(NH_3)$, $CaCl_2 \cdot 2$–4 $(NH_3)$, $LiCl \cdot 0$–3 $(NH_3)$, $SrBr_2 \cdot 2$–8 $(NH_3)$, $CaBr_2 \cdot 2$–6 $(NH_3)$, $FeCl_2 \cdot 2$–6 $(NH_3)$, $CoCl_2 \cdot 2$–6 $(NH_3)$, $FeBr_2 \cdot 2$–6 $(NH_3)$, $NiCl_2 \cdot 2$–6 $(NH_3)$, $CoBr_2 \cdot 2$–6 $(NH_3)$, $MgCl_2 \cdot 2$–6 $(NH_3)$, $MgBr_2 \cdot 2$–6 $(NH_3)$, $MnCl_2 \cdot 2$–6 $(NH_3)$, $MnBr_2 \cdot 2$–6 $(NH_3)$, $CuSO_4 \cdot 2$–4 $(NH_3)$, $SnCl_2 \cdot 0$–2.5 $(NH_3)$, $CaCl_2 \cdot 0$–1 $(NH_3)$, $CaCl_2 \cdot 1$–2 $(NH_3)$ and mixtures thereof. Preferred high vapor pressure complex compounds are $CaCl_2 \cdot 4$–8 $(NH_3)$, $CaCl_2 \cdot 2$–4 $(NH_3)$ and mixtures thereof, $SrCl_2 \cdot 1$–8 $(NH_3)$, $BaCl_2 \cdot 0$–8 $(NH_3)$, $LiCl \cdot 0$–3 $(NH_3)$, $SrBr_2 \cdot 2$–8 $(NH_3)$, $CaBr_2 \cdot 2$–6 $(NH_3)$, $CuSO_4 \cdot 2$–4 $(NH_3)$, $NaBF_4 \cdot 0.5$–2.5 $(NH_3)$ and $NaBr \cdot 0$–5.25 $(NH_3)$. Other complex compounds for staged multiple reactor apparatus including identification of low and high pressure compounds are disclosed in U.S. Pat. Nos. Re. 34,259, 5,079,928 and 5,263,330.

Figure 4:
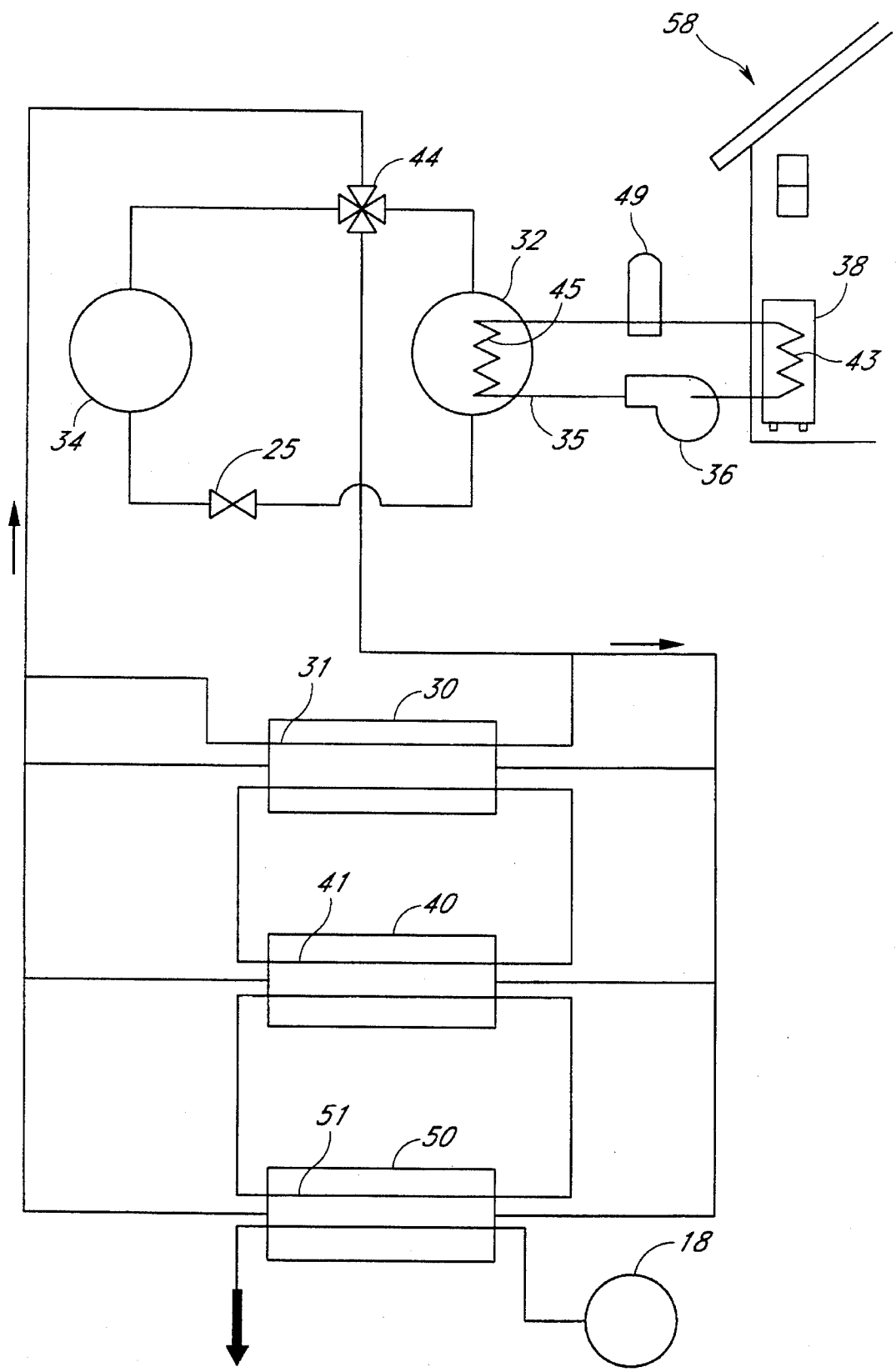
FIG. 4 schematically illustrates a three stage heat pump apparatus useful for heating and air conditioning.

In FIG. 4, a three stage residential heat pump system is illustrated. Each of the reactors 30, 40 and 50 contain a different complex compound. The different complex compounds are selected to provide an ascending order of gaseous reactant vapor pressure whereby the adsorbing temperature of a lower vapor pressure complex compound at a low reaction pressure (adsorption) is higher than the desorption temperature of the next successive higher vapor pressure complex compound at a high reaction pressure (desorption) as previously described regarding the two stage system of FIG. 3. The higher temperature, lowest pressure complex compound is located in reactor 50, an intermediate temperature complex compound in reactor 40, and a low temperature, high pressure complex compound in reactor 30. Each of the reactors is provided with a heat exchange section and conduits extending therebetween to cooperate for directing interstage heat transfer fluids for staging the reactions in the respective reactors. Burner 18 or other heat source provides heat to desorb the complex compound in reactor 50. When reactor 50 is adsorbing, a heat transfer fluid heated by the exothermic adsorption reaction is directed from reactor 50 to reactor 40 for driving desorption therein. When reactor 40 is adsorbing, because of its temperature differential with the complex compound in reactor 30, a heat transfer fluid directs heat from adsorbing reactor 40 to desorbing reactor 30. As previously described, when low temperature sorber 30 is adsorbing, condensed refrigerant from evaporator-condenser 32 or evaporator-condenser 34 is directed to the heat transfer section of reactor 30 for cooling the reactor as previously described. Four-way valve 44 directs the refrigerant to either of the evaporator-condenser components 32 or 34 depending on the desired function of the heat pump for heating or cooling residence 58. An optional domestic hot water storage tank 49 is shown in the hydronic loop comprising the components illustrated in FIG. 3. Further descriptions of such multiple phase CPES systems and operations are described in U.S. Pat. Nos. 5,263,330 and 5,079,928 and are incorporated herein by reference.

It will be understood that the description of the different apparatus herein for heating or cooling a residence can be used for any other desired heating or cooling function, whether it be space heating or cooling, heating radiators, and/or with air handling components for space heating or air conditioning, hot water heating, or the like. Although a burner is disclosed to provide prime heat for driving desorption reactions in the high-temperature reactors of FIGS. 3 and 4, or reactors illustrated in FIGS. 1 and 2, other sources of heat including solar heating apparatus, alone or in combination with electrical heaters, steam sources, exhaust gas heaters from combustion of gas, oil or other fuels and the like may also be used and incorporated in such systems. These as well as other advantages of such systems will be evident to those skilled in the art within the purview of the invention.

We claim:

1. A heating system comprising:

(a) one or more reactors or reactor banks each containing a complex compound formed by adsorbing a polar gas on a metal salt, and in which said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride or bromide, and wherein said complex compound in said one or more reactors is formed by restricting the volumetric expansion and controlling the density thereof, during said adsorption of said polar gas on said metal salt, whereby said complex compound is capable of increased reaction rates in moles of said polar gas adsorbed and/or desorbed per mole of said complex compound per hour at adsorption or desorption times of less than 60 minutes, respectively, as compared to a complex compound formed without restricting the volumetric expansion and controlling the density thereof said one or more reactors each having a heat transfer section for thermally exposing a heat transfer fluid and/or condensed polar gas in heat exchange communication with said complex compound;

(b) condenser means comprising at least one condenser for condensing said polar gas and heat recovery means cooperating therewith for recovering heat generated in said condenser means;

(c) evaporator means comprising at least one evaporator for evaporating condensed polar gas;

(d) a first conduit for directing condensed polar gas from said condenser means to said evaporator means;

(e) one or more second conduits cooperating with said condenser means and said one or more reactors for directing condensed polar gas from said condenser means to said reactor heat transfer section and for directing vaporized polar gas therefrom to said condenser means;

(f) one or more third conduits for directing polar gas from said evaporator means to said reactors and from said reactors to said condenser means; and (g) heating means cooperating with said one or more reactors for heating said complex compound therein.

2. The system of claim 1 wherein said one or more reactors comprise one or more reaction chambers having a maximum mean mass diffusion path length of less than about 15 mm.

3. The system of claim 2 wherein said one or more reaction chambers have a maximum thermal diffusion path length of between about 0.6 and about 3 mm, a maximum mean mass diffusion path length of between about 2.5 and about 7 mm, and wherein said salt or said complex compound has a density of between about 0.2 and about 0.8 g/cc of reaction chamber volume.

4. The system of claim 2 including a plurality of heat transfer fins extending along said reactor and in heat transfer communication with said metal salt, wherein the distance between said fins is 2.8 mm or less.

5. The system of claim 2 wherein said one or more reaction chambers have a maximum thermal diffusion path length of less than about 4.5 mm.

6. The system of claim 2 wherein said complex compound or said metal salt has a density in said reactor of between about 0.2 and about 1.0 g/cc of reaction chamber volume.

7. The system of claim 2 including gas distribution means for directing said polar gas to and from said metal salt or said complex compound in said one or more reaction chambers, and wherein at least 60% of said metal salt or said complex compound, by weight, is within 25 mm or less of a gas distribution means.

8. The system of claim 2 including one or more heat exchange surfaces in thermal contact with said metal salt and said complex compound and comprising a gas permeable material.

9. The system of claim 2 including one or more gas permeable surfaces extending into said reaction chamber in contact with said metal salt and said complex compound along at least a portion of said gas permeable surface.

10. The system of claim 2 wherein said metal salt and said complex compound comprise a mixture thereof, respectively, with a gas permeable admixture composition having a microporous surface for distributing said polar gas in said mixture.

11. A system of claim 1 wherein said one or more reactors comprise one or more reaction chambers having a maximum thermal diffusion path length of less than 1.5 mm.

12. The system of claim 11 including gas distribution means for directing said polar gas to and from said metal salt or said complex compound in said reaction chambers, and wherein at least 60% of said metal salt or said complex compound, by weight, is within 25 mm or less of a gas distribution means.

13. The system of claim 11 wherein said one or more reaction chambers have a maximum mean mass diffusion path length of less than about 15 mm.

14. The system of claim 11 including one or more heat exchange surfaces in thermal contact with said metal salt and said complex compound and comprising a gas permeable material.

15. The system of claim 11 including one or more gas permeable surfaces extending into said reaction chamber in contact with said metal salt and said complex compound along at least a portion of said gas permeable surface.

16. The system of claim 11 wherein said metal salt and said complex compound comprise a mixture thereof, respectively, with a gas permeable admixture composition having a microporous surface for distributing said polar gas in said mixture.

17. The system of claim 1 wherein said one or more reactors comprise one or more reaction chambers in which at least 60% of said metal salt or said complex compound, by weight, is within 25 mm or less of a gas distribution means.

18. The system of claim 17 wherein said one or more reaction chambers have a maximum thermal diffusion path length of less than 1.5 mm.

19. The system of claim 17 including one or more heat exchange surfaces in thermal contact with said metal salt and said complex compound and comprising a gas permeable material.

20. The system of claim 17 including one or more gas permeable surfaces extending into said reaction chamber in contact with said metal salt and said complex compound along at least a portion of said gas permeable surface.

21. The system of claim 1 wherein said heating means comprises electrical resistance heating means.

22. The system of claim 1 wherein said heating means comprises direct firing or hot gases of combustion for heating said complex compounds.

23. The system of claim 1 wherein said heating means comprises a heat transfer fluid for heating said complex compounds.

24. The system of claim 23 including a burner for heating said heat transfer fluid.

25. The system of claim 23 including solar heating means for heating said heat transfer fluid.

26. The system of claim 1 wherein said heating means comprises a heat pipe or thermosyphon for heating said complex compounds.

27. The system of claim 1 wherein said heat recovery means cooperating with said condenser includes forced air convection apparatus.

28. The system of claim 1 wherein said heat recovery means apparatus comprises a hydronic heating apparatus including space and/or hot water heating components.

29. The system of claim 28 wherein said hydronic heating apparatus includes a pump and hot water directing conduits.

30. The system of claim 1 including a heat exchanger cooperating with said first conduit directing condensed polar gas from said condenser to said evaporator and a second conduit directing polar gas from said evaporator to said one or more reactors for transferring heat therebetween.

31. The system of claim 1 wherein said complex compound comprises $CaCl_2 \cdot X$ ($NH_3$) complexes, $SrCl_2 \cdot 1-8$ ($NH_3$), $SrBr_2 \cdot 2-8$ ($NH_3$), $CaBr_2 \cdot 2-6$ ($NH_3$), $CaI_2 \cdot 2-6$ ($NH_3$), $FeCl_2 \cdot 2-6$ ($NH_3$), $FeBr_2 \cdot 2-6$ ($NH_3$), $FeI_2 \cdot 2-6$ ($NH_3$), $CoCl_2 \cdot 2-6$ ($NH_3$), $CoBr_2 \cdot 2-6$ ($NH_3$), $MgCl_2 \cdot 2-6$ ($NH_3$), $MgBr_2 \cdot 2-6$ ($NH_3$), $MnCl_2 \cdot 2-6$ ($NH_3$), $MnBr_2 \cdot 2-6$ ($NH_3$), $NiCl_2 \cdot 2-6$ ($NH_3$), $LiCl \cdot 0-3$ ($NH_3$), $CuSO_4 \cdot 2-4$ ($NH_3$), $SnCl_2 \cdot 0-2.5$ ($NH_3$), $NaBF_4 \cdot 0.5-2.5$ ($NH_3$), $NaBr \cdot 0-5.25$ ($NH_3$) or mixtures thereof.

32. The system of claim 1 comprising one or more first reactors or reactor banks and one or more second reactors or reactor banks, said first reactors or reactor banks and said second reactors or reactor banks adsorbing and desorbing said polar gas in opposing cycles, respectively, said system including control means cooperating with said conduits for reversing the heating and cooling function of the system and for controlling the flow of polar gas to said condenser means and said evaporator means.

33. The system of claim 32 wherein said control means includes a pair of checkflowrater valves in said first conduit.

34. A heat pump system comprising:

(a) two or more reactors or reactor banks each containing a different complex compound therein formed by adsorbing a polar gas on a metal salt, and in which said polar gas is alternately adsorbed and desorbed on said complex compound, said metal salt comprising a halide, nitrate, nitrite, oxalate, perchlorate, sulfate or sulfite of an alkali metal, alkaline earth metal, transition metal, zinc, cadmium, tin or aluminum, or sodium borofluoride or a double metal chloride or bromide, and wherein said complex compound in said two or more reactors is formed by restricting the volumetric expansion and controlling the density thereof during said adsorption of said polar gas on said metal salt, whereby said complex compound is capable of increased reaction rates in moles of said polar gas adsorbed and/or desorbed per mole of said complex compound per hour at adsorption or desorption times of less than 60 minutes, respectively, as compared to a complex compound formed without restricting the volumetric expansion and controlling the density thereof, wherein said different complex compounds each have a different polar gas vapor pressure and wherein the adsorption temperature of a lower vapor pressure compound at adsorption pressure is at least 8° C. higher than the desorption temperature of a higher vapor pressure compound at desorption pressure, said two or more reactors or reactor banks each having a heat transfer section for thermally exposing a heat transfer fluid and/or condensed polar gas in heat exchange communication with said complex compound;

(b) a first evaporator-condenser means for supplying heating and cooling and heat exchange means cooperating therewith for recovering said heating and cooling, and a second evaporator-condenser means and heat exchange means cooperating therewith for rejecting thermal energy therefrom;

(c) a first conduit for directing condensed polar refrigerant between said first and second evaporator-condenser means;

(d) one or more second conduits for directing condensed polar gas from a condensing evaporator-condenser means to the heat transfer section of a reactor containing the higher vapor pressure complex compound and for directing vaporized polar gas therefrom to said condensing evaporator-condenser means;

(e) one or more third conduits for directing polar gas from an evaporating evaporator-condenser means to said two or more reactors; and (f) heating means cooperating with said one or more reactors for heating said complex compound therein.

35. The system of claim 34 wherein said one or more reactors comprise one or more reaction chambers having a maximum mean mass diffusion path length of less than about 15 mm.

36. The system of claim 35 wherein said one or more reaction chambers have a maximum thermal diffusion path length of between about 0.6 and about 3 mm, a maximum mean mass diffusion path length of between about 2.5 and about 7 mm, and wherein said salt or said complex compound has a density of between about 0.2 and about 0.8 g/cc of reaction chamber volume.

37. The system of claim 35 including a plurality of heat transfer fins extending along said reactor and in heat transfer communication with said metal salt, wherein the distance between said fins is 2.8 mm or less.

38. The system of claim 35 wherein said one or more reaction chambers have a maximum thermal diffusion path length of less than about 4.5 mm.

39. The system of claim 35 wherein said complex compound or said metal salt has a density in said reactor of between about 0.2 and about 1.0 g/cc of reaction chamber volume.

40. The system of claim 35 including gas distribution means for directing said polar gas to and from said metal salt or said complex compound in said one or more reaction chambers, and wherein at least 60% of said metal salt or said complex compound, by weight, is within 25 mm or less of a gas distribution means.

41. The system of claim 35 including one or more heat exchange surfaces in thermal contact with said metal salt and said complex compound and comprising a gas permeable material.

42. The system of claim 35 including one or more gas permeable surfaces extending into said reaction chamber in contact with said metal salt and said complex compound along at least a portion of said gas permeable surface.

43. The system of claim 35 wherein said metal salt and said complex compound comprise a mixture thereof, respectively, with a gas permeable admixture composition having a microporous surface for distributing said polar gas in said mixture.

44. The system of claim 34 wherein said one or more reactors comprise one or more reaction chambers having a maximum thermal diffusion path length of less than 1.5 mm.

45. The system of claim 44 including gas distribution means for directing said polar gas to and from said metal salt or said complex compound in said reaction chambers, and wherein at least 60% of said metal salt or said complex compound, by weight, is within 25 mm or less of a gas distribution means.

46. The system of claim 44 wherein said one or more reaction chambers have a maximum mean mass diffusion path length of less than about 15 mm.

47. The system of claim 44 including one or more heat exchange surfaces in thermal contact with said metal salt and said complex compound and comprising a gas permeable material.

48. The system of claim 44 including one or more gas permeable surfaces extending into said reaction chamber in contact with said metal salt and said complex compound along at least a portion of said gas permeable surface.

49. The system of claim 44 wherein said metal salt and said complex compound comprise a mixture thereof, respectively, with a gas permeable admixture composition having a microporous surface for distributing said polar gas in said mixture.

50. The system of claim 34 wherein said one or more reactors comprise one or more reaction chambers in which at least 60% of said metal salt or said complex compound, by weight, is within 25 mm or less of a gas distribution means.

51. The system of claim 50 wherein said one or more reaction chambers have a maximum thermal diffusion path length of less than 1.5 mm.

52. The system of claim 50 including one or more heat exchange surfaces in thermal contact with said metal salt and said complex compound and comprising a gas permeable material.

53. The system of claim 50 including one or more gas permeable surfaces extending into said reaction chamber in contact with said metal salt and said complex compound along at least a portion of said gas permeable surface.

54. The system of claim 34 wherein said heating means comprises electrical resistance heating means.

55. The system of claim 34 wherein said heating means comprises hot gases of combustion for heating said complex compounds.

56. The system of claim 34 wherein said heating means comprises a heat transfer fluid for heating said complex compounds.

57. The system of claim 56 including a burner for heating said heat transfer fluid.

58. The system of claim 56 including solar heating means for heating said heat transfer fluid.

59. The system of claim 33 wherein said heating means comprises a heat pipe or thermosyphon for heating said complex compounds.

60. The system of claim 34 wherein said heat exchange means cooperating with said first evaporator-condenser means includes a hydronic heating apparatus including space and/or hot water heating components.

61. The system of claim 34 wherein said heat exchange means cooperating with said first evaporator-condenser means includes forced air convection apparatus.

62. The system of claim 60 wherein said heat exchange means cooperating with said first evaporator-condenser means includes forced air convection apparatus.

63. The system of claim 34 including means for supplying a heat transfer fluid to and from said reactors and for directing the heat transfer fluid from an exothermic adsorption reaction to a reactor for driving an endothermic desorption reaction.

64. The system of claim 34 wherein a high vapor pressure complex compound is selected from the group consisting of $CaCl_2 \cdot 4-8$ ($NH_3$), $CaCl_2 \cdot 2-4$ ($NH_3$) and mixtures thereof, $SrCl_2 \cdot 1-8$ ($NH_3$), $BaCl_2 \cdot 0-8$ ($NH_3$), $LiCl \cdot 0-3$ ($NH_3$), $SrBr_2 \cdot 2-8$ ($NH_3$), $CaBr_2 \cdot 2-6$ ($NH_3$), $CuSO_4 \cdot 2-4$ ($NH_3$), $NaBF_4 \cdot 0.5-2.5$ ($NH_3$), and $NaBr \cdot 0-5.25$ ($NH_3$), and mixtures thereof.

65. The system of claim 34 wherein a lower vapor pressure complex compound is selected from the group consisting of $SrCl_2 \cdot 1-8$ ($NH_3$), $CaCl_2 \cdot 2-4$ ($NH_3$), $SrBr_2 \cdot 2-8$ ($NH_3$), $CaBr_2 \cdot 2-6$ ($NH_3$), $FeCl_2 \cdot 2-6$ ($NH_3$), $CoCl_2 \cdot 2-6$ ($NH_3$), $FeBr_2 \cdot 2-6$ ($NH_3$), $NiCl_2 \cdot 2-6$ ($NH_3$), $CoBr_2 \cdot 2-6$ ($NH_3$), $MgCl_2 \cdot 2-6$ ($NH_3$), $MgBr_2 \cdot 2-6$ ($NH_3$), $MnCl_2 \cdot -6$ ($NH_3$), $MnBr_2 \cdot 2-6$ ($NH_3$), $SnCl_2 \cdot 0-2.5$ ($NH_3$), $CuSO_4 \cdot 2-4$ ($NH_3$), and $CaCl_2 \cdot 0-1$ ($NH_3$), $CaCl_2 \cdot 1-2$ ($NH_3$) and mixtures thereof.

66. The system of claim 34 comprising one or more first reactors or reactor banks and one or more second reactors or reactor banks, said first reactors or reactor banks and said second reactors or reactor banks adsorbing and desorbing said polar gas in opposing cycles, respectively, said system including control means cooperating with said conduits for reversing the heating and cooling functions of the system and for controlling the flow of polar gas to said condenser means and said evaporator means.

67. The system of claim 66 wherein said control means includes a pair of checkflowrater valves in said first conduit.

68. The system of claim 32 wherein said condenser means comprises a condenser and a reservoir cooperating therewith for receiving condensed refrigerator from said condenser.

69. The system of claim 68 including one or more valves cooperating with said one or more second conduits for selectively directing condensed refrigerant from said reservoir to said heat transfer section of said one or more first reactors or reactor banks and said one or more second reactors or reactor banks.

* * * * *